Inventor:
Everett W. Werts,
by William D Roberson
His Attorney.

July 3, 1962 E. W. WERTS 3,042,900

SHIFT REGISTERS

Filed Oct. 29, 1959 2 Sheets-Sheet 2

Inventor:
Everett W. Werts,
by William D Roberson
His Attorney.

United States Patent Office 3,042,900
Patented July 3, 1962

3,042,900
SHIFT REGISTERS

Everett W. Werts, Normal, Ill., assignor to General Electric Company, a corporation of New York
Filed Oct. 29, 1959, Ser. No. 849,516
6 Claims. (Cl. 340—168)

Figure 1:
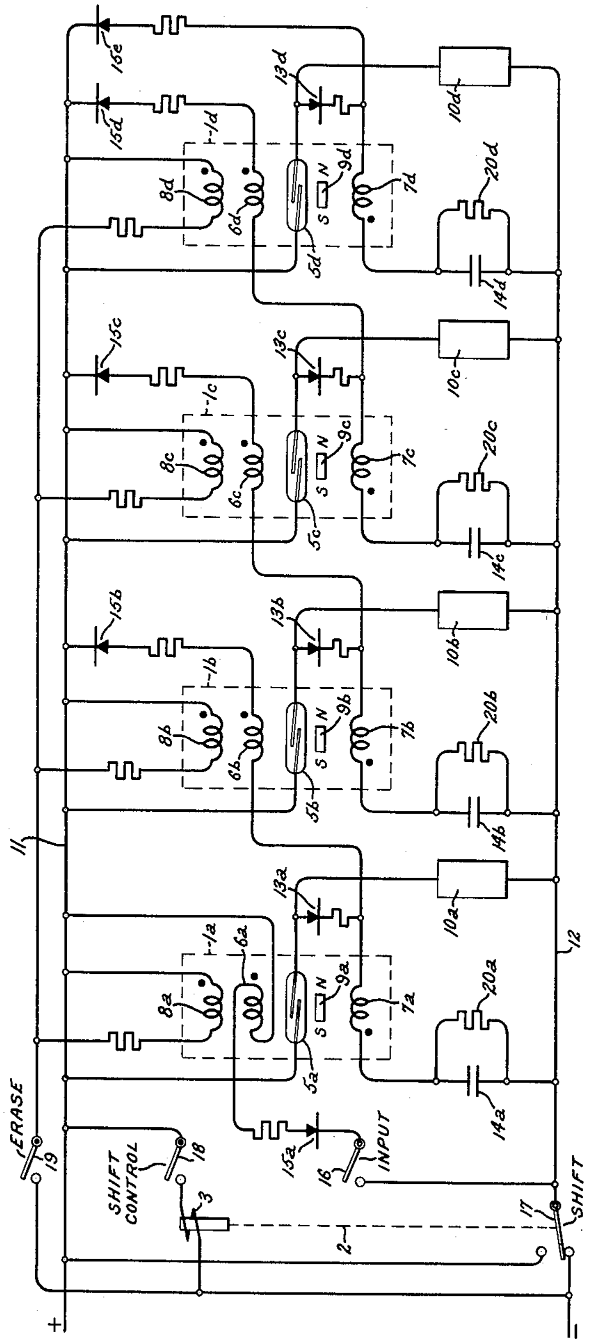

This invention relates to electrical shift registers and more particularly to shift registers which employ a single current-controlling electromagnetic relay per stage.

Generally, shift register circuits include an ordered array or series of stages in which information may be stored in accordance with a code, each bit of information being represented by a particular and corresponding pattern of states of the stages. Information in a shift register circuit is represented in digital fashion and each stage in the array is given a condition which characterizes either a digit or the absence of a digit, corresponding respectively to a "1" or a "0." By convention, a digit or a "1" is usually equated to an "on" or energized condition of a load associated with one of the register stages, while the "off" or deenergized condition of the load corresponds to a zero or the absence of a digit. The shift register circuit operates in response to shift signals applied at spaced time intervals, so that subsequent to the application of the shift signal a digit is registered in each storage element next adjacent the storage element where a digit had previously been registered and the absence of a digit is registered in those storage elements next adjacent the storage elements where previously the absence of a digit had been registered. When a shift signal is applied therefore, the condition existing at any stage is shifted to the next stage and, once a pattern has been established in the shift register circuit, each succeeding shift signal shifts that pattern by one step in a forward direction along the array of stages. Thus there must be both an erasure of previously stored information and the storage of new information in each stage upon occurrence of the shift signal.

It is an object of this invention to provide a shift register circuit having a permanent memory of its condition so that even when the circuit is deenergized and subsequently reenergized, whether purposely or accidentally, the shift register returns to its last given condition.

It is another object of this invention to provide a shift register which can provide a power output from each stage of the array that is capable of operating relays or other mechanisms without additional amplification.

It is a still further object of this invention to provide a shift register circuit employing readily obtainable circuit components which are easily wired, readily adjusted for uniformity of operation and in which each stage of the register is capable of receiving information from the preceding stage and simultaneously passing information previously contained in it along to the next succeeding stage.

Still another object of this invention is to provide a shift register circuit which supplies continuous power output to each of its energized loads, and which requires no special-purpose shift signal generator.

By way of a brief summary of a preferred embodiment of the present information, a shift register circuit is provided comprising an array of electromagnetic relay stages each having an On winding, an Off winding, and bistable switch contacts connected in series with a separate load across a D.C. power supply. Whenever the relay switch closes, thereby energizing its associated load, it also completes a charging circuit for a transfer capacitor in the same stage. A single pole, double throw shift switch which normally completes one side of the power circuit to each stage, when operated opens the power circuit and closes a discharge circuit for each of the transfer capacitors through an Off winding of its associated relay and through an On winding of the next succeeding relay in the array, thereby shifting the digital information along the array of stages in the register. Other aspects of the invention include proportioning the On and Off windings so that one of the shift register stages which is on will not be turned off by the shift action if the next preceding stage has been on. Consequently, each stage in the shift register array is capable of receiving information from the preceding stage and simultaneously passing information previously contained in it along to the next succeeding stage.

As will be seen this shift register circuit provides a continuous power output to each load which is switched on, as contrasted with the pulse output characterizing most other shift registers. The circuit requires no special shift signal generator and will operate reliably under wide variations in supply voltage without any voltage regulation being required. Consequently, this circuit is particularly well suited to industrial control applications.

Figure 2:
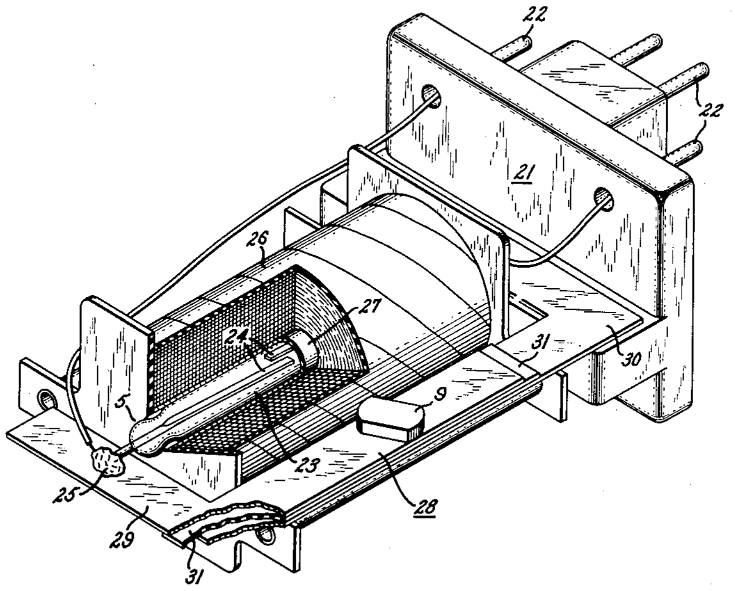

While the scope of this invention in its broader aspects is not to be limited except by the appended claims, further details of the invention as well as additional objects and advantages will become more apparent with reference to the accompanying drawings wherein:

FIG. 1 is a circuit diagram of a shift register constructed in accordance with this invention; and FIG. 2 is a perspective view, partially cut away, of a bistable reed switch relay forming part of the circuit of FIG. 1.

Referring now to the drawings, the preferred embodiment of the shift register circuit illustrated in FIG. 1 comprises a series of similar bistable relays 1*a* to 1*d* inclusive. Where the same reference number is employed to designate identical elements in each stage of the shift register shown, lower case letters *a* to *d* are also employed to associate these elements with relays 1*a* to 1*d* respectively. It is to be understood, of course, that although but four shift register stages are shown for illustrative purposes, in actual practice the shift register circuit will more often than not have many more serially connected stages than that. Each of the bistable relays preferably includes a reed switch 5, and a plurality of control windings 6, 7, and 8 respectively. The relays 1*a* to 1*d* are rendered bistable by biasing magnets 9 whose function will be more readily apparent with reference to FIG. 2. As shown in that figure the relay is mounted on a base 21 having plug-in terminals 22 for connection to a socket not shown. At the heart of the relay is situated the magnetic reed switch 5 having a sealed glass envelope 23 enclosing a pair of elongated flexible magnetic contact members or reeds 24. This reed switch is actuated by axially directed components of an induced magnetic field which causes the two contact members to have a mutual attraction. When the induced field within the reeds becomes strong enough it overcomes their inherent resilience and closes the contacts; when the field strength falls below a certain level the resilience of the contact members again opens the contacts. The overlapping ends of the contact members are preferably plated with a suitable contact material such as rhodium while their opposite ends pass through the envelope to form a pair of external terminals 25.

A composite group of windings 26 made up of the individual control windings 6, 7, and 8 shown in FIG. 1 surround the reed switch to supply the operating fluxes lengthwise of the magnetic reeds. The employment of multiple control windings on a single relay may sometimes result in unwanted inductive coupling of transients between the windings. To minimize such an effect, a shorted turn is provided in the form of a copper tube 27 upon which the windings are wound. This shorted turn retards the rates of change of flux in the relay, thereby reducing the induced voltages in the windings.

In order to reduce the total ampere turns required to supply the requisite flux component to operate the switch a magnetic yoke 28 spans the two ends of the reed switch projecting beyond the windings 26. The combination of the yoke 28 and the reeds 24 constitute a closed loop magnetic circuit which extends through the inside and about the outside of the operating windings. Besides containing the operating fluxes within a high efficiency magnetic circuit and thereby improving the relay's sensitivity the magnetic yoke 28 also renders the relay relatively insensitive to external stray magnetic fluxes which might unpredictably alter the operation of the switch.

Naturally, the yoke 28 must be so constructed that it does not short-circuit the two ends of the reed switch rendering it inoperative. This is done by forming the yoke of a pair of laminations 29 and 30 of a high permeability ferromagnetic material. These laminations overlap each other for a considerable portion of their length, being separated from each other by a thin electrically insulating strip 31. In order to render the relay switch bistable the permanent magnet 9 is mounted on the magnetic circuit in a region where the two magnetic laminations overlap each other. A large portion of the flux produced by the permanent magnet will merely be shunted between its poles by the underlying laminations contributing to a partial saturation of these laminations. Another significant portion of the flux from the permanent magnet will traverse the magnetic circuit through the magnetic reeds providing a certain minimum or biasing flux within the reeds. Adjustment of the amount of biasing flux introduced by the permanent magnet may be varied simply by rotating the magnet in place. When the magnet is aligned generally parallel to the laminations it will produce the greatest effect, whereas when it is oriented transverse to the laminations its effect will be the least.

For the purposes of the shift register circuit shown in FIG. 1 the flux introduced into the magnetic reeds by the permanent magnet is adjusted to a value great enough to maintain the contacts closed once they have come into contact, but insufficient to close the contacts of its own force. Such adjustment renders the relay bistable so that it may be opened or closed by current pulses of the proper polarity in the control windings. After the desired adjustment of the position of the permanent magnet is achieved, it is fastened securely in place by cementing to insure permanence of adjustment. The reed switch relay shown in FIG. 2 is not itself the subject of the present application but is described more fully and claimed in a copending joint application entitled "Electromagnetic Relay," S.N. 849,936, filed October 30, 1959, in the name of Charles J. Adams and myself and assigned to the assignee of the present invention.

Each of the switches 5 in the relay units of FIG. 1 is connected in series with a load 10 schematically indicated in block form. The switch and load are connected across conductors 11 and 12 which in combination with the power supply connected across them, but not shown in the figure, constitute a power supply circuit. The loads 10, may in specific applications of the shift register circuit shown, take the form of an indicating lamp for monitoring the operation of the register, a controlled device of some sort, or both of these.

Certain other relationships between the circuit components should be particularly noted. For example, in each stage the reed switch 5 and rectifier 13 complete a series connection across the power supply circuit through Off winding 7 and transfer capacitor 14. Another series connection through transfer capacitor 14 and Off winding 7 to the power supply circuit is completed through On winding 6 of the next adjacent relay and rectifier 15. Rectifiers 13 and 15 are, however, poled in opposite directions so that current can flow one way in the first of these series circuits and another way in the other of the series circuits. Also shown in FIG. 1 are four switches designated Input switch 16 through which digital information is placed on the first stage of the register, Shift switch 17 by means of which a shift of the information already in the register is accomplished, Shift Control switch 18 which controls the operation of Shift switch 17, and Erase switch 19 which can clear register to prepare it to receive new information. Shift switch 17 forms a part of the shift relay 2 whose operating winding 3 is in series with and is governed by the Shift Control switch 18. The Input switch 16, the Shift switch 17, the Shift Control switch 18, and the Erase switch 19 are all shown in their normal or unactuated positions. In these positions switches 16, 18, and 19 are open while the single pole, double throw Shift switch 17 completes the circuit on the negative side of the power supply.

The operation of the shift register circuit may now be considered. Initially it may be assumed that each of the switches in the circuit is in the position shown including the reed switches *5a* to *5d* which are all open. In this condition of the circuit current flow through each of the On windings 6 is blocked, in relay *1a* by the normally open Input switch 16 and in relays *1b*, *1c*, and *1d* by rectifiers *15b*, *15c*, and *15d* respectively. Capacitors 14 are uncharged and for this reason, as will be seen, operation of the Shift switch to its upper shift position in which it connects conductor 11 with conductor 12 will not change the state of any of the relays 1 to 4 and they all remain off.

Assume now that with the Shift switch 17 in its normal position shown the Input switch 16 is closed momentarily. This operation permits a current to flow from conductor 11 through On winding *6a* thereby closing switch *5a*. Switch *5a* remains closed even after the Input switch 16 is opened again because of the bistable feature described more fully above in connection with FIG. 2. With switch *5a* closed a current flows through rectifier *13a* and Off winding *7a* to charge the transfer capacitor *14a*. It should be noted that the direction of current flow in the Off winding *7a* is not in the direction to open switch *5a*. At this time the only effect of the current flow in Off winding *7a* is to maintain switch *5a* closed with an increased force. Since resistance *20a* across transfer capacitor *14a* is large in comparison with the rest of the resistance in its series circuit, capacitor *14a* charges nearly to the full potential of the power supply.

Now with transfer capacitor *14a* charged and the Input switch 16 again opened, movement of the Shift switch 17 to its upper shift position will cause the condition of relay *1a* to be transferred or shifted to relay *1b* with the result that the switch *5a* will be opened and switch *5b* will be closed. This results from the fact that movement of Shift switch 17 to its upper shift position completes a discharge circuit for capacitor *14a* through the Off winding *7a*, through On winding *6b*, through rectifier *15b*, conductor 11, Shift switch 17, and conductor 12. Consequently current supplied by transfer capacitor *14a* is at this time in the proper direction through Off winding 7*a* to open switch 5*a* and simultaneously energizes On winding 6*b* to close switch 5*b*. As a result load 10*a* is deenergized while load 10*b* is energized. When switch 5*b* closes and energizes load 10*b* it also begins to charge the transfer capacitor 14*b* so that on the next succeeding operation of Shift switch 17 to its shift position, the transfer capacitor 14*b* provides current through Off winding 7*b* and through On winding 6*c* to shift the energization from load 10*b* to load 10*c*. The shift operation is identical for each stage except the last. In the last stage, however, the transfer capacitor 14*d* discharges only through Off winding 7*d* and rectifier 15*e*, there being no succeeding On winding for it to energize.

It has been shown above that with no digits on any of the stages, operation of Shift switch 17 leaves each of the stages and its associated load in the "off" condition. It has also been shown that isolated digits are shifted along the array with each operation of the Shift switch. It will now be shown how pairs or other multiples of adjacent digits are also shifted along the array.

Consider the case where switches 5*a* and 5*b* are both closed energizing loads 10*a* and 10*b* simultaneously. In this condition both transfer capacitors 14*a* and 14*b* are charged. When the Shift switch is operated to its upper shift position it completes a discharge circuit for both of these transfer capacitors. It is by now apparent that current in the Off winding 7a of the first stage will succeed in deenergizing the load 10*a* by opening switch 5*a*. It should also be apparent that current in the On winding 6*c* of the third stage will close switch 5*c* and turn on the load 10*c*. But in the second stage, at the same time the current through Off winding 7*b* tends to open the switch 5*b*, another current through On winding 6*b* tends to keep it closed. If the number of ampere turns in each of the windings 6*b* and 7*b* is identical, the result will be simply a cancellation of the fluxes induced by these two windings permitting the switch, because of its bistable nature, to remain closed. In practice, however, I prefer to construct the On windings 6 with a greater number of turns to insure that they will always in such a situation keep the switch contacts closed. Consequently, load 10*a* is deenergized, load 10*b* remains energized, the load 10*c* is energized anew. The practical effect is that information previously stored in the first and second stages of the shift register is shifted to the second and third stages.

In FIG. 1 the negative power leads to the different loads are shown connected directly to the common negative conductor 12 of the power circuit for the separate units. This is significant because the power circuit is opened only at the shift switch at the start of the shift operation so that the reed switches 5*a* to 5*d* are unloaded at the time they are opened or closed by the capacitor discharge currents during the shift operation. Furthermore, when the shift switch recloses the power circuit, the capacitor charging currents flow through the Off windings in the different stages in a direction to increase the magnetic attraction of the closed reed switches thereby increasing the contact pressure during periods of relatively high current flow. Both of these effects, unloading of the reed switches during contact operation and increased contact pressure of these same switches during periods of high current flow, contribute significantly to long contact life.

Each of the Erase windings 8*a* through 8*d* is shown as connected across the power circuit through a normally open Erase switch 19 for simultaneously erasure of information stored in each of the stages upon closure of switch 19. By separate and reversible current controls these Erase windings can be used individually to close or open selected switches in the different stages.

Undervoltage protection is a feature of the preferred circuit shown. It will readily be appreciated that if the potential across conductors 11 and 12 drops to too low a level, the response of the different shift register stages may become erratic with the consequent possibility that errors may appear in the information stored in the circuit. To avoid errors resulting from undervoltage, the shift relay 2 is rated so it will not respond to a supply voltage less than is required for reliable register operation. Relay winding 3 is connected through Shift Control switch 18 across the same source of potential which supplies conductors 11 and 12. If the source potential falls too low operation of Shift Control switch 18 will not cause the relay winding 3 to pick up Shift switch 17. Consequently the information will remain as it was stored on the shift register circuit instead of being subjected to a possibly faulty shift operation.

While I have shown but one circuit diagram illustrating a preferred embodiment of this invention, certain variations of construction within the scope of these teachings will undoubtedly occur to those skilled in the art to which the invention pertains. For example, although the connection of loads 10*a* to 10*d* to the negative power circuit for the separate stages tends to improve the life of the relay switches, as has been indicated, by unloading them during opening and closing, the momentary interruption of the loads occasioned by operation of the Shift switch may in given instances prove objectionable. If this is so, the negative side of the loads can be connected directly to the negative power line on the other side of the Shift switch. Or again, although but a single reed switch has been shown in each stage of the register, two or more switches could be operated by the windings in each relay thereby providing additional isolated switch contacts where desired. Furthermore, if permanent memory is not required, the magnets 5 can be omitted and bistability of the relay in each stage may be provided by a biasing current in one of its windings. These and all other modifications or substitutions that fall within the true spirit and scope of this invention in its broader aspects are intended to be covered by the appended claims.

What I claim as new and desire to secure by Letters Patent of the United States is:

1. A shift register circuit comprising: a power supply circuit including a pair of conductors adapted to be energized from a source of direct current potential; a plurality of consecutively arranged information shifting stages forming an ordered array, each stage including a relay having bistable switch contacts and electrical windings for closing and opening said switch contacts depending on the direction of current flow therein; a plurality of transfer capacitors each connected in series with the switch contacts in one of said stages across said pair of conductors, whereby said transfer capacitors are charged from said source of potential when the associated switch contacts are closed; shift switching means for completing a series discharge circuit for each of said transfer capacitors through the electrical windings of the relay in its associated stage and through the electrical windings of the relay in the next succeeding stage, the current flow in said discharge circuit being in a direction to open the switch contacts in the stage associated with each transfer capacitor and to close the contacts in the next succeeding stage.

2. A shift register circuit comprising: a power supply circuit including a pair of conductors adapted to be energized from a source of direct current potential; a plurality of consecutively arranged information shifting stages forming an ordered array, each stage including a relay having bistable switch contacts and electrical windings for closing and opening said switch contacts depending on the direction of current flow therein; a plurality of transfer capacitors each associated with one of said stages; a plurality of charging circuits each associated with one of said stages comprising the switch contacts and the transfer capacitor associated with each stage connected in series across said pair of conductors; rectifier means in each of said charging circuits to permit current to flow therein only in a direction to charge the transfer capacitors; each of said transfer capacitors being connected in series with at least a portion of the electrical windings in its associated stage and with at least a portion of the electrical windings in the next succeeding stage across said pair of conductors to form a plurality of discharge circuits; rectifier means in each of said discharge circuits to permit current flow therein only in a direction to discharge said capacitors; and shift switching means for interrupting the power supply circuit and for completing a circuit between said conductors to permit discharge currents to flow in said discharge circuits, the current flow in said discharge circuits being in a direction to open the switch contacts in the stage associated with each discharging transfer capacitor and to close the contacts in the next succeeding stage.

3. A shift register circuit comprising: a power supply circuit including a pair of conductors adapted to be energized from a source of direct current potential; a plurality of consecutively arranged information shifting stages forming an ordered array, each stage including a relay having an On winding, an Off winding, and bistable switch contacts operated by said windings; a plurality of transfer capacitors each associated with one of said stages and each connected in series with the switch contact in its associated stage across said pair of conductors, whereby said transfer capacitor is charged from said source of potentials when said switch contacts are closed; rectifier means in series with each of said switch contacts to permit current to flow through said contacts only in a direction to charge said transfer capacitor; a plurality of discharge circuits each including one of said transfer capacitors, the Off winding of its associated stage, and the On winding of the next consecutive stage in said array connected in series relationship across said conductors; rectifier means in said discharge circuit to permit current to flow therein only in a direction to discharge said transfer capacitors; and shift switching means for completing a circuit between said conductors independent of said source of potential to permit each of the charged transfer capacitors in said array to support a discharge current in its discharge circuit, each of said discharge currents traversing the Off winding in its discharge circuit in a direction tending to open the switch contacts associated with a discharging transfer capacitor and traversing the On winding in its discharge circuit in a direction tending to close the switch contacts in the next succeeding stage.

4. A shift register circuit comprising: a power supply circuit including a pair of conductors adapted to be energized from a source of direct current potential; a plurality of consecutively arranged information shifting stages forming an ordered array, each stage including a relay having an On winding, an Off winding, and bistable switch contacts operated by said windings; a plurality of transfer capacitors each associated with one of said stages; a plurality of charging circuits each associated with one of said stages comprising the switch contacts, the Off winding, and the transfer capacitor associated with each stage connected in series across said pair of conductors, whereby each transfer capacitor is charged from said source of potentials when its associated switch contacts are closed, said capacitor charging currents traversing said Off windings in a direction to increase the contact pressure of the switch contacts associated therewith; rectifier means in series with each of said switch contacts to permit current to flow through said contacts only in a direction to charge said transfer capacitor; a plurality of discharge circuits each including one of said transfer capacitors, the Off winding of its associated stage, and the On winding of the next consecutive stage in said array connected in series relationship across said conductors; rectifier means in said discharge circuit to permit current to flow therein only in a direction to discharge said transfer capacitors; and shift switching means for completing a circuit between said conductors independent of said source of potential to permit each of the charged transfer capacitors in said array to support a discharge current in its discharge circuit, each of said discharge currents traversing the Off winding in its discharge circuit in a direction tending to open the switch contacts associated with a discharging transfer capacitor and traversing the On winding in its discharge circuit in a direction tending to close the switch contacts in the next succeeding stage.

5. A shift register circuit comprising: a power supply circuit including a pair of conductors adapted to be energized from a source of direct current potential; a plurality of consecutively arranged information shifting stages forming an ordered array, each stage including a relay having an On Winding, an Off winding, and bistable switch contacts operated by said windings; a plurality of transfer capacitors each associated with one of said stages and each connected in series with the switch contacts in its associated stage across said pair of conductors, whereby each transfer capacitor is charged from said source of potentials when its associated switch contacts are closed; a plurality of electrical load elements each connected in series with one of said switch contacts across said conductors and in parallel with the transfer capacitor in the same stage forming a plurality of consecutive load circuits energized selectively by the closing of said switch contacts; rectifier means in series with each of said switch contacts to permit current to flow through said contacts only in a direction to charge said transfer capacitor; a plurality of discharge circuits each including one of said transfer capacitors, the Off winding of its associated stage, and the On winding of the next consecutive stage in said array connected in series relationship across said conductors; rectifier means in said discharge circuit to permit current to flow therein only in a direction to discharge said transfer capacitors; and shift switching means for completing a circuit between said conductors independent of said source of potential to permit each of the charged transfer capacitors in said array to support a discharge current in its discharge circuit, each of said discharge currents traversing the Off winding in its discharge circuit in a direction tending to open the switch contacts associated with a discharging transfer capacitor and traversing the On winding in its discharge circuit in a direction tending to close the switch contacts in the next succeeding stage.

6. A shift register circuit comprising: a power supply circuit including a pair of conductors adapted to be energized from a source of direct current potential; a plurality of consecutively arranged information shifting stages forming an ordered array, each stage including a relay having an On winding, an Off winding, and bistable switch contacts operated by said windings; a plurality of transfer capacitors each associated with one of said stages and each connected in series with the Off winding and the switch contacts in its associated stage across said pair of conductors forming a capacitor charging circuit, whereby said transfer capacitor is charged from said source of potentials when said switch contacts are closed, the direction of the currents which flow in said Off windings to charge said capacitor being such as to increase the contact pressure of said switch contacts thereby tending to prolong the life of said switch contacts; rectifier means in each of said charging circuits to permit current to flow therein only in a direction to charge said transfer capacitor; a plurality of discharge circuits each including one of said transfer capacitors, the Off winding of its associated stage, and the On winding of the next succeeding stage in said array connected in series relationship across said conductors; rectifier means in said discharge circuit to permit current to flow therein only in a direction to discharge said transfer capacitors; a plurality of electrical loads connected in series with said switch contacts across said conductors and in parallel with said transfer capacitor forming a plurality of consecutive load circuits energized by the closing of said switch contacts; and shift switching means for interrupting said load circuits and for completing a circuit between said conductors independent of said source of potential to permit each of the charged transfer capacitors in said array to support a discharge current in its discharge circuit, each of said discharge currents traversing the Off winding in its discharged circuit in a direction tending to open the switch contact associated with a discharging transfer capacitor and traversing the On winding in its discharge circuit in a direction tending to close the switch contact in the next succeeding stage, the interruption of said load circuits by said shift switching means tending further to prolong the life of said switching contacts by unloading them while opening and closing.

References Cited in the file of this patent

UNITED STATES PATENTS

| | | |
|---|---|---|
| 2,168,198 | Frink | Aug. 1, 1939 |
| 2,825,890 | Ridler et al. | Mar. 4, 1958 |
| 2,914,749 | Sande et al. | Nov. 24, 1959 |